J. DIBER.
PIPE MOLDING MACHINE.
APPLICATION FILED MAY 19, 1911.
1,060,437.
Patented Apr. 29, 1913.
2 SHEETS—SHEET 2.
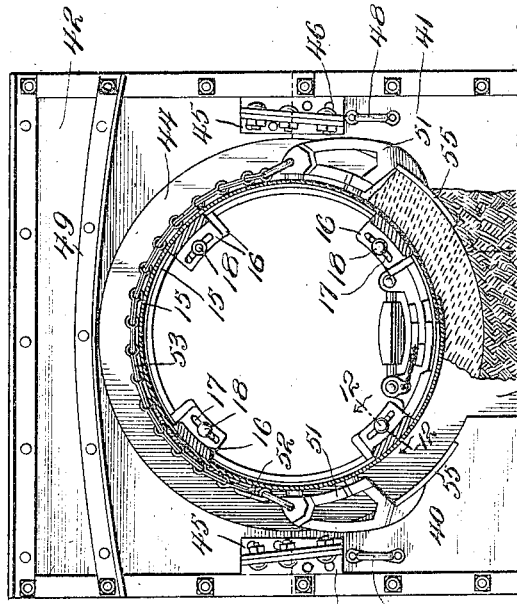
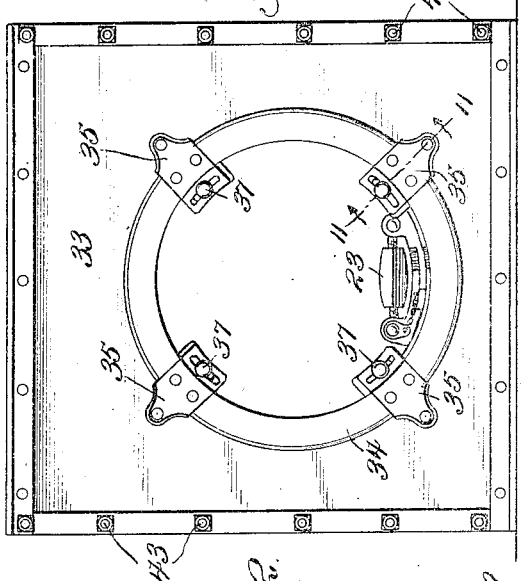
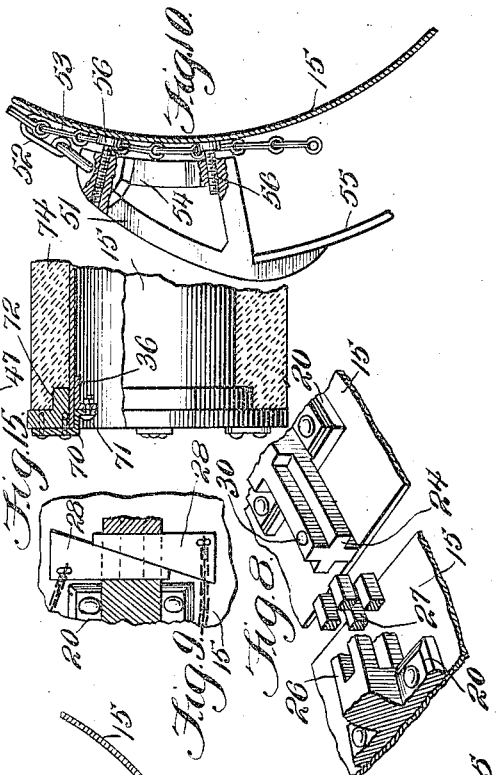
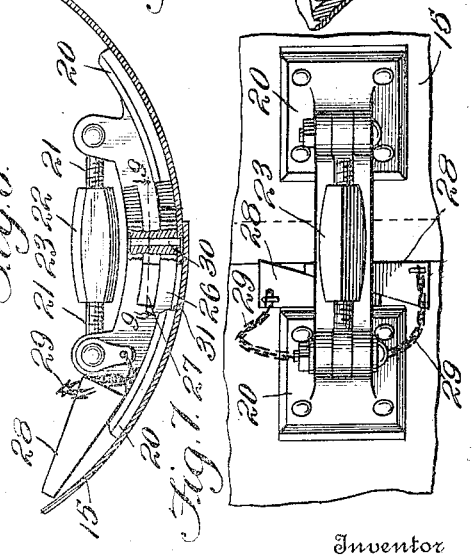
Inventor
Jacob Diber,
By Victor J. Evans
Attorney
Witnesses

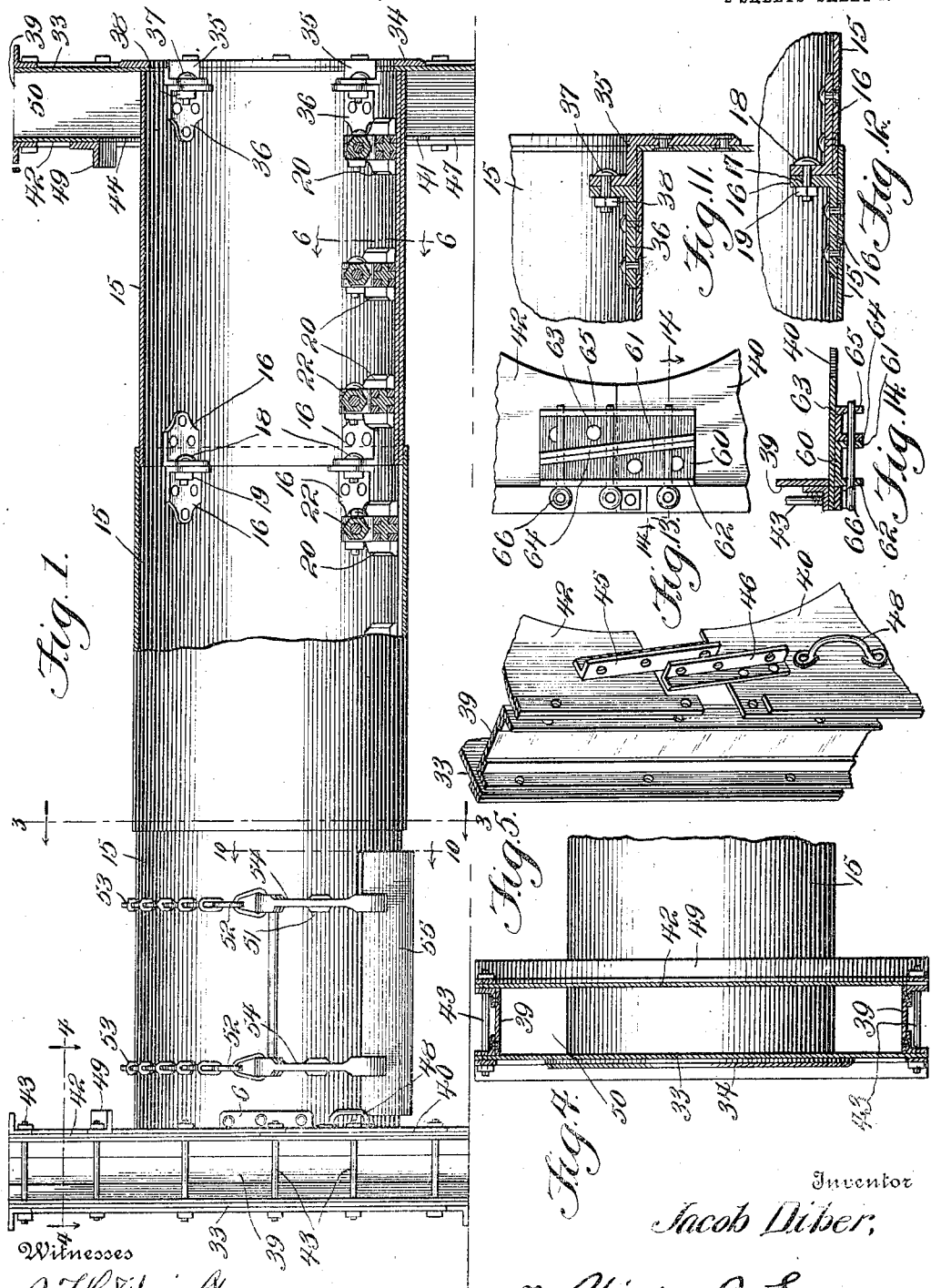

UNITED STATES PATENT OFFICE.

JACOB DIBER, OF BEAVER, OHIO.

PIPE-MOLDING MACHINE.

1,060,437.  Specification of Letters Patent.  Patented Apr. 29, 1913.

Application filed May 19, 1911. Serial No. 628,204.

*To all whom it may concern:*

Be it known that I, JACOB DIBER, a citizen of the United States, residing at Beaver, in the county of Pike and State of Ohio, have invented new and useful Improvements in Pipe-Molding Machines, of which the following is a specification.

The invention relates to molds, particularly to separable molds, and has for an object to provide a device for molding sewer pipes and like conduits from plastic materials.

Among other features my invention embodies a structure with which pipe sections can be molded from plastic materials, in which the mold can be easily and quickly separated from the finished product without injuring or breaking the same.

My invention further embodies a structure, for molding pipes and conduits, terminating in flanges formed integrally with the mentioned pipes or conduits, the means for molding the flanges being mounted to coöperate with the mold body adapted for forming the tubular portions of the pipes or conduits.

For the purpose mentioned, use is made of flexible tubular sections, capable of being radially expanded or contracted and having their ends disposed in overlapping position, the tubular portion of the finished article being adapted to conform to the contour of the mentioned tubular sections, end frames for connection with the sections to form end flanges on the finished article, the mentioned end frames being removable from the said sections, means for retaining the sections in relatively rigid position and trowels adjustably mounted on the mentioned sections and adapted to shape the peripheral surface of the finished product so that the same will conform to the contour of the sections.

Reference is to be had to the accompanying drawings, constituting a part of this specification, in which similar characters of reference denote corresponding parts in all the views, and in which—

Figure 1 is a side elevation of my molding machine, parts being broken away to disclose the underlying structure. Fig. 2 is an end view. Fig. 3 is a vertical sectional view, taken on the line 3—3 in Fig. 1, looking in the direction of the arrow, a portion of the finished product being shown in section. Fig. 4 is a horizontal sectional view, taken on the line 4—4 in Fig. 1, looking in the direction of the arrow. Fig. 5 is a fragmentary perspective view showing a plurality of the end sections in disconnected position. Fig. 6 is a vertical sectional view taken on the line 6—6 in Fig. 1, looking in the direction of the arrow and showing the manner of retaining the edges of the tubular sections in overlapping position. Fig. 7 is a plan view of the structure shown in Fig. 6. Fig. 8 is a fragmentary perspective view of the turnbuckle plates, showing the same in disconnected position. Fig. 9 is a fragmentary horizontal sectional view taken on the line 9—9 in Fig. 6 and showing the wedges for interlocking the turnbuckle plates. Fig. 10 is a vertical sectional view taken on the line 10—10 in Fig. 1, looking in the direction of the arrow and showing the manner of positioning the trowels on the tubular sections. Fig. 11 is a sectional view taken on the line 11—11 in Fig. 2, looking in the direction of the arrow and showing the manner of securing the collar to one of the outer plates. Fig. 12 is a sectional view taken on the line 12—12 in Fig. 3, looking in the direction of the arrow and showing the manner of interlocking the tubular sections. Fig. 13 is a fragmentary end elevation, disclosing a modified manner of connecting the end sections. Fig. 14 is a horizontal sectional view taken on the line 14—14 in Fig. 13, looking in the direction of the arrow. Fig. 15 is a fragmentary side elevation of a modified form of my device and showing the manner of forming the lap flange on a pipe that is being molded. Fig. 16 is a fragmentary vertical sectional view of a modified form of my device, disclosing the use of divided sections and the manner of connecting the divided portions of the sections.

Referring more particularly to the various views, I employ a plurality of flexible tubular sections 15 adapted to be removably connected, with the end of one section positioned to overlap the end of the next adjacent section. Secured to the inner periphery of the sections 15, at the ends thereof are angle bars 16 provided with slots 17 and when it is desired to connect adjacent sections, as mentioned, the angle bars on one of the sections are positioned to aline with the angle bars of the next adjacent section, bolts 18 provided with nuts 19 being passed through the registering slots 17 of the alining angle bars to releasably retain the sections 15 in relatively rigid position when the nuts 19 are screwed up on the bolts 18, it being understood that the bolts 18 are slidable in the slots 17 when the nuts 19 are loosened relatively to the bolts 18 so that a slight turning movement of one of the sections relatively to the adjacent section can be obtained, as shown more particularly in Figs. 1, 3 and 12. In this manner any number of sections can be separably connected and the mentioned separably connected sections are adapted to constitute the core for the tubular portion of the pipe that is to be molded or built up around the sections.

The sections 15, each consist of a plate bent in a tubular form with the longitudinal edges of each plate disposed to relatively overlap and secured to the inner periphery of each of the sections, on both sides of the point of overlapping of the edges are turnbuckle plates 20, the turnbuckle plates on one side of the point of overlapping being arranged in relatively opposite relation to the turnbuckle plates on the other side of the point of overlapping, threaded rods 21 being pivotally mounted on the turnbuckle plates and positioned to be threadedly engaged by sleeves 22, thus adjustably connecting the overlapping edges of each section 15, the threads on the connectible rods 21 being arranged in opposite relation, as are also the threads on the sleeves 22 which connect the rods 21 so that the shanks 22 and rods 21 constitute turnbuckles 23, the rotation of the sleeves 22 being adapted to move the overlapping edges of the sections 15 either toward or away from one another as will be readily understood. Thus it will be seen that when it is desired to connect adjacent sections 15, the turnbuckles 23 on each of the sections are operated to either increase or decrease the diameter of the sections so that one of the sections can be positioned with the ends thereof overlapping the ends of the adjacent sections and when this has been accomplished, the adjacent sections are connected by passing the bolts 18 through the slots 17 of the angle bars 16, after which a more accurate adjustment of the adjacent angle bars and turnbuckles 23 can be secured to retain the adjacent sections in connected position, thus forming the core for the tubular portion of the pipe that it is desired to mold. The turnbuckle plates 20 on one side of the point of overlapping of the sections 15 are provided with integral extensions 24 forming guides 25 and the turnbuckle plates on the opposite side of the point of overlapping of the sections 15 are provided with integral extensions 26 forming guideways 27, the guides 24 being slidably received in the guideways 27, thus permitting of more easily adjusting the turnbuckles 23. To reduce the strain on each of the turnbuckles 23 when the sections 15 have been relatively positioned and the tubular portion of the pipe is being molded around the same, I employ a plurality of pairs of wedges 28 connected to chains 29 secured to the turnbuckle plates 20 and the mentioned wedges are adapted to be extended into the guideways 27 from opposite sides thereof so that the angular edges of each pair of wedges 28 will abut and the outer edge of one of the wedges in each pair will abut against the edge of each of the turnbuckle plates to which the wedge is connected, while the outer edge of the other wedge in each pair of wedges will abut against the outer end of each of the guides 24, formed on each of the opposing turnbuckle plates 20. With the arrangement of the pairs of wedges 28 in connection with the turnbuckle plates 20, any buckling or stripping of threads on the turnbuckles 23 is avoided and the entire collapsing strain of the sections 15 is transferred from the turnbuckles 23 to the guides 24 and the pairs of wedges 28 positioned in the guideways 27. Pins 30 are vertically extended through guides 24 of the turnbuckle plates 20 on one side of the point of overlapping, to more rigidly retain the turnbuckles in position, as shown in Fig. 6.

When a series of sections 15 have been connected by the angle bars 16, as heretofore mentioned, the free ends of the outer sections 15 are extended into end pieces 33 and a collar 34, positioned to abut against the outer sides of the end pieces 33, is provided with slotted angle bars 35 adapted to engage slotted angle bars 36 secured to the inner peripheries of the extreme outer sections 15, bolts 37, provided with nuts 38 being passed through the slots in the angle bars 35 and 36 to retain the ends of the outer sections 15 in engagement with the end pieces 33 as shown in Figs. 1, 2 and 4 and more particularly in Fig. 11, the arrangement of the angle bars 35 and 36 being similar to the arrangement of the relative angle bars 16, shown in detail in Fig. 12.

Spaced from the end pieces 33 by flanged side pieces 39 are flanged side sections 40 and 41 and a flanged top 42, bolts 43 being passed through the end pieces 33, the flanges of the side pieces 39 and the side sections 40, 41 and 42 to retain the sections 40, 41 and 42 and the end pieces 33 in rigid position relatively to the side pieces 39. The flanged sections 40, 41 and 42 each have cut out portions adapted to constitute openings 44 when the mentioned flanged sections 40, 41 and 42 are relatively connected, the said openings being of a greater diameter than the diameter of the sections 15, the difference between the diameter of the end sections 15 and the openings 44 being equal to the thickness of the shell of the pipe that is to be molded around the sections 15, as will be hereinafter more fully disclosed, it being understood that the contour of the outer sections 15 is similar to that of the openings 44, the ends of the outer sections 15 being passed through the openings 44. Secured to the upper flanged section 42 are apertured L-bars 45, extending downwardly at an angle to the vertical axis of the flanged section 42, the lower ends of the L-bars 45 being positioned horizontally a greater distance from the side of the flanged section 42 than the upper ends of the L-bars and secured to each of the side sections 40 and 41 are similar apertured L-bars 46, the said L-bars 46 being extended upwardly from the sections 40 and 41 and in parallel relation to the L-bars 45, suitable bolts being adapted to be passed through the apertures in the L-bars 45 and 46, thus rigidly retaining the flanged sections 40 and 41 in rigid engagement with the upper flanged section 42 as will be readily understood. The openings 44, although similar in contour to the end sections 15, terminate at the lower portion thereof in a slot 47, the mentioned slot being formed by cutting away portions of the bases of the flanged sections 40 and 41, as shown in Fig. 3. Secured to the side sections 40 and 41 are handles 48 for facilitating the separation of the relative side sections and extending transversely to the upper sections 42 and secured thereto are braces 49, the said braces being provided to prevent any buckling of the sections 42. The end pieces 33, together with the side pieces 39 and the sections 40, 41 and 42 constitute flange boxes 50 for forming the end flanges on the pipe that is to be molded around the sections 15 and the mentioned boxes are arranged in connection with the sections 15 so that the sections will be spaced from the ground or base upon which my molding machine is adapted to repose, thus enabling the molder or operator to comfortably mold entirely around the sections 15, as will be more fully described hereinafter.

Forming trowels 51 are mounted on the outer sides of the sections 15 and are provided with hooks 52 for engagement with chains 53, the mentioned trowels 51 being preferably positioned on the sections 15 in pairs and connected by the chains 53, as will be readily seen by referring to Fig. 3. The trowels 51 each consist of a frame 54, connected by the hooks 52 to the chains 53 and secured to the lower ends of each of the frames 54 and depending therefrom is a trowel body 55, the said trowel body being spaced from the outer periphery of each of the sections 15. Threadedly mounted on the frames 54 are screws 56 having their outer ends abutting against the sections 15 and the mentioned screws are adjustable relatively to the frames 54 so that the trowel bodies 55 on each of the frames 54 can be adjusted to be positioned either nearer or farther away from the sections 15 as will be readily understood by referring to Fig. 10, it being understood that the trowels 51 can be slidably operated to any desired position on the sections 15.

In the use of my device for molding sewer pipes and the like, the sections 15 are connected by the angle bars 16 as heretofore mentioned with the ends of adjacent sections overlapping and the longitudinal edges of the sections retained in overlapping position by the turnbuckles 23 as shown in Fig. 1 and the trowels 51 are moved into lowered position on one side of the sections 15, after which a backing is formed against the outer sides of the trowel bodies 55 by packing a suitable dirt or gravel against the under side of one of the trowels 51 as shown in Fig. 3, it being understood that the trowel body 55 is spaced from the sections 15. When the packing has been properly disposed as mentioned, a quantity of concrete is packed between the trowel body and the periphery of the sections 15 after which the trowel 51 is slid upwardly and a new packing is provided, thus permitting the operator to supply more concrete between the trowel body and the periphery of the sections 15. In this manner the concrete is placed around the sections 15 in the step by step manner and when this has been completed, the sections 15 will be entirely surrounded by concrete, the thickness of the concrete being equal to the distance between the sections 15 and the trowel body 55. The flange boxes 50 are now filled with concrete by pouring the concrete into the flange boxes from the open upper end thereof and after this has been completed the entire mass of concrete is permitted to set and harden. When the concrete has become suitably hardened, the wedges 28 are removed from locking engagement with the turn buckles 23 and the bolts 18 and 37 are loosened relatively to the angle bars 16 and 36. The sleeves 22 of the turnbuckles 23 are now operated to move the overlapping longitudinal edges of the sections 15 into a greater overlapping position, thus decreasing the diameters of the sections. When this has been accomplished the bolts 43 are removed from engagement with the flanged sections 40, 41 and 42 and the bolts 37 are removed from engagement with the angle bars 36, thus permitting the molder to disengage the end pieces 33 from the sections 40, 41 and 42. The bolts connecting the L-bars 45 and 46 are now removed therefrom and the upper sections 42, at both ends of the sections 15 can be removed from engagement with the sections 40 and 41, after which the handles 48 on the side sections 40 and 41 are grasped and the mentioned side sections are then slid outwardly. The sections 15, having been previously reduced in diameter are now slid outwardly from the tubular portion of the concrete and when this has been accomplished, the finished product or concrete pipe can be taken out of the backing 57, the mentioned pipe being provided at both ends with flanges which were formed in the boxes 50 at both ends of the connected sections 15, as will be readily understood. Thus it will be seen that by employing sections, end pieces and flanged sections separably connected, the various parts of my mold can be easily and quickly disengaged and removed from the partially hardened mass of concrete to disclose the finished product and the mentioned tubular sections, end pieces and flanged sections can be conveniently removed without breaking or injuring the partially hardened mass of concrete, constituting the finished concrete pipe. Suitable reinforcing members can be used in connection with the concrete adapted to constitute the finished pipe and the base of the portion of the pipe can be conveniently made a trifle larger in thickness thus greatly adding to the strength of the pipe.

Although I have shown a series of tubular sections positioned in relative relation it will be understood that any number of sections can be employed and connected in the manner described and the said sections can be made to any size convenient to the particular use and the work for which they are adapted.

In Figs. 13 and 14 I disclose a modified construction, showing a convenient manner for connecting the flanged sections 40, 41 and 42 and in which I employ a channel bar 60 secured to one of the lower flanged sections 40, the said channel bar being provided with transversely extending apertures and having one of the sides 61 thereof inclined upwardly at an angle to the other side 62 of the channel bar, it being understood that one of the channel bars 60 is secured to the section 40 and a similar channel bar is secured to the opposing section 41 in a similar manner. Secured to each side of the upper section 42 and depending therefrom is a channel bar 63 having the inner side 64 inclined relatively to the outer side 65, with the mentioned side 64 adapted to abut against the inclined side 61 of the channel bar 60 and the channel bar 63 is provided with transversely extending apertures adapted to register with the apertures in the channel bar 60 when the channel bars 60 and 63 are connected as mentioned, suitable pins 66 being passed through the apertures in the channel bars to retain the same in locked position.

In Fig. 15 I disclose a modified construction embodying a means for providing the tubular portion of a pipe at the ends thereof with lap flanges instead of abutting flanges. In this construction I employ angle bars 70 connected by bolts 71 to the angle bars 36, the box 50 being removed from the ends of the sections 15. The outer ends of the angle bars 70 extend beyond the periphery of the outer sections 15 and secured to the outer ends of the angle bars 70 are circular lap flanges 72, the mentioned lap flanges being adapted to form recesses in the finished tubular portion 74 of the pipe so that an adjacent pipe provided with abutting flanges can be fitted in the recesses formed in the ends of the pipe 74, thus permitting one pipe to form a socket adapted to receive the end of the adjacent pipe. In this manner a large number of concrete pipes can be connected without fear of any leakage between the ends of the pipes and after being connected as mentioned, the pipes can be cemented or otherwise retained in connecting position.

In Fig. 16 I disclose a modified construction and in which I employ a plurality of sections 80, having a hemispherical contour and provided at their upper ends with angle bars 81, and 82, the said angle bars being adapted to be connected by bolts 83, the lower ends of the sections 80 being connected as heretofore mentioned by the usual turnbuckles 23 mounted on the plates 20 secured to the sections 80 as has been heretofore described. With this construction, when the sections 80 are disengaged by removing the bolts 83 from the angle bars 81 and 82 and by disengaging the various parts of the turnbuckles 23, each of the sections 80 will consist of half sections, which can be placed within one another when it is desired to transfer my mold from one place to another, the half sections when arranged in the manner described being adapted to form a compact and portable package.

Although for the purpose of describing my invention I have shown a particular construction thereof and have shown and described various modified forms of my construction, it will be understood that I do not limit myself to the structure embodied in the drawings and description, the scope of the invention being defined in the appended claims and it will be further understood that various changes may be made in the structures disclosed in the drawings without departing from the spirit of the invention and although I have described my mold as used in connection with sewer pipes, it will be understood that the same can be used for molding various kinds of conduits and ducts.

Having thus fully described the invention, what I claim as new, is:—

1. In combination with a pipe molding machine, consisting of flexible connectible sections provided with flange boxes, turn buckle plates secured to the said sections, guides formed on certain of said turnbuckle plates and operable in guideways formed in oppositely disposed turnbuckle plates, screw rods pivotally mounted on the turnbuckle plates, threaded sleeves for connecting the said screw rods and adjustable thereon and wedges mounted on the said turnbuckle plates for removable insertion in the said guideways to retain the opposite turnbuckle plates in locked position.

2. In combination with a pipe molding machine consisting of connectible sections, plates on the said sections, guides on the said plates and operable in guideways in oppositely arranged plates, rods pivotally mounted on the said plates, shanks adjustably connecting the said rods, and wedges for insertion in the said guideways to retain opposite plates in locked relation.

3. In combination with a pipe molding machine consisting of connectible sections, means for pivotally adjusting the said sections, trowels supported on the said sections and slidable thereon, and screws having threaded connection with the said trowels and engaging the said sections to space portions of the trowels relatively to the sections and for adjusting the said trowels relatively to the said sections.

In testimony whereof I affix my signature in presence of two witnesses.

JACOB DIBER.

Witnesses:
F. A. HOSTER,
E. EDMONSTON, Jr.